United States Patent
Bell et al.

(12) 
(10) Patent No.: US 6,779,392 B2
(45) Date of Patent: Aug. 24, 2004

(54) TIRE TESTING DEVICE INCORPORATING A PRESSURE SENSOR, TEMPERATURE SENSOR AND OXYGEN SENSOR

(75) Inventors: Colin Frederick Bell, Wythall (GB); John Martin Knotts, Stourbridge (GB)

(73) Assignee: Newbow Aerospace Limited, Redditch (DE)

( * ) Notice: Subject to any disclaimer, the term of this patent is extended or adjusted under 35 U.S.C. 154(b) by 0 days.

(21) Appl. No.: 10/257,800

(22) PCT Filed: Apr. 17, 2001

(86) PCT No.: PCT/IB01/00623

§ 371 (c)(1),
(2), (4) Date: Oct. 15, 2002

(87) PCT Pub. No.: WO01/79802

PCT Pub. Date: Oct. 25, 2001

(65) Prior Publication Data

US 2003/0121318 A1 Jul. 3, 2003

(30) Foreign Application Priority Data

Apr. 17, 2000 (GB) .............................................. 0009328
Jan. 27, 2001 (GB) .............................................. 0102172

(51) Int. Cl.$^7$ ................................................ B60C 23/02
(52) U.S. Cl. ...................................................... 73/146.8
(58) Field of Search ............................... 73/146, 146.2, 73/146.3, 146.8, 708; 340/442–447

(56) References Cited

U.S. PATENT DOCUMENTS 6,486,771 B1 * 11/2002 Fuller et al. ................ 340/442

FOREIGN PATENT DOCUMENTS

FR 2 548 780 1/1985
GB 2 246 860 2/1992

* cited by examiner

Primary Examiner—William Oen
(74) Attorney, Agent, or Firm—Yongzhi Yang; Steven J. Hultquist; Marianne Fuierer

(57) ABSTRACT

This invention relates to a tire testing device, and in particular to a device for testing the tires of aircraft. The tire testing device includes a pressure sensor and a temperature sensor, allowing the calculation of the effective pressure at a reference temperature, so that the tires can be tested hot or cold. The device also includes an oxygen sensor, so that the oxygen content of the tire can be determined at the same time.

10 Claims, 2 Drawing Sheets

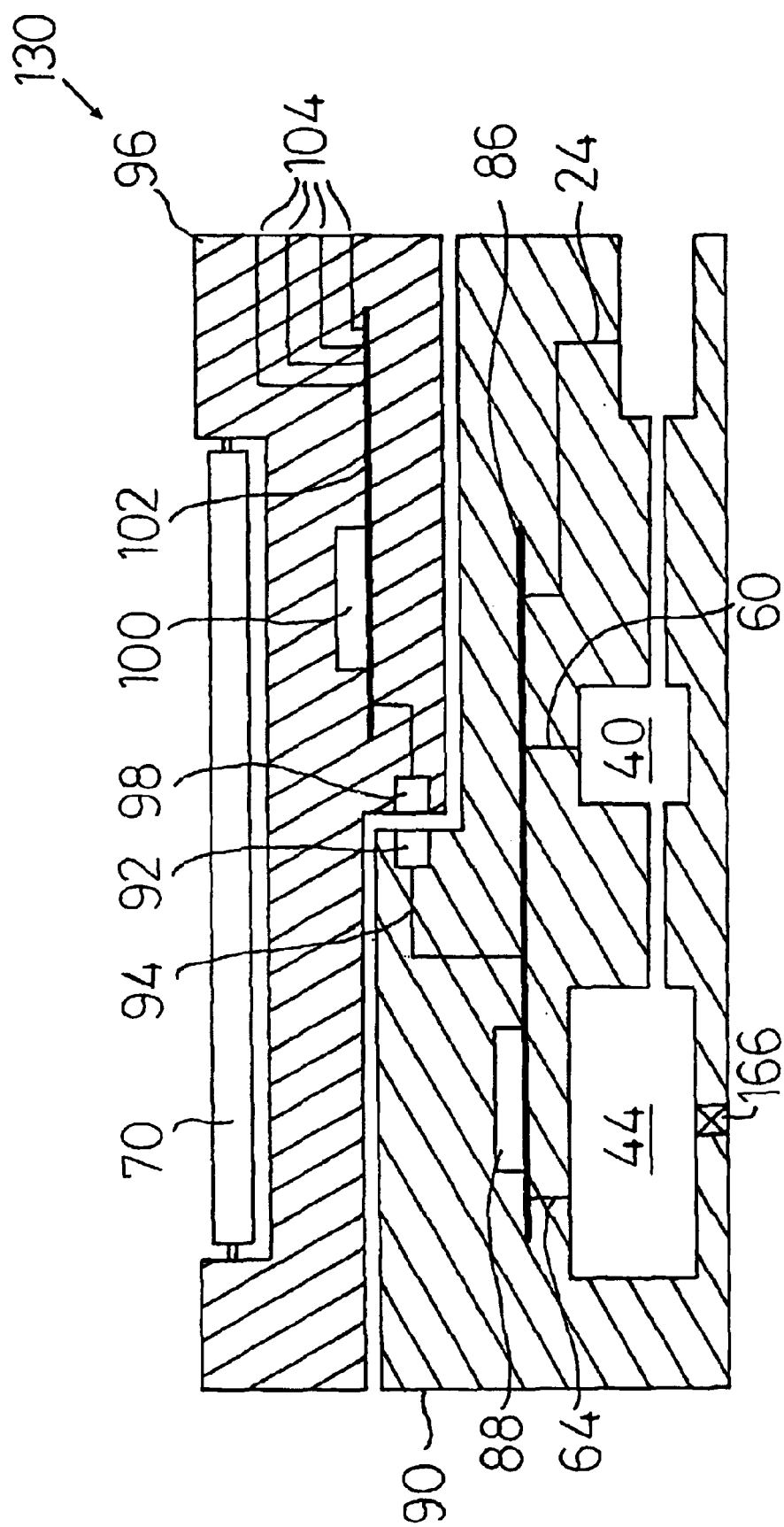

US 6,779,392 B2

TIRE TESTING DEVICE INCORPORATING A PRESSURE SENSOR, TEMPERATURE SENSOR AND OXYGEN SENSOR

CROSS-REFERENCE TO RELATED APPLICATIONS

This application is filed under the provisions of 35 USC §371 and claims the priority of International Patent Application No. PCT/IB01/00623 filed Apr. 17, 2001, which in turn claims priority of Great Britain Patent Application No. 0009328.6 filed Apr. 17, 2000 and Great Britain Patent Application No. 0102172.4 filed Jan. 27, 2001.

FIELD OF THE INVENTION

This invention relates to a tire testing device, and in particular to a device for testing the tires of aircraft.

1. BACKGROUND TO THE INVENTION

Aircraft tires are required to contain a maximum of 5% oxygen. The reason for this is that if tires become heated to more than approximately 200° C. (which may occur if a set of brakes is binding or dragging), the chlorobutyl in the tire material begins to break down and to produce isoprene, and isoprene and oxygen together form an auto-ignitable mixture. The auto-ignition of aircraft tires might have been the cause of an unknown number of previously unexplained losses of aircraft.

The instance of such auto-ignition is likely to increase because it is becoming increasingly common to fit aircraft with carbon brakes. Carbon brakes are advantageous since they are lighter, more efficient and longer-lasting than conventional brakes. However, whilst conventional brakes melt at around 400° C., carbon brakes are effective up to around 1100° C., so that the temperature which can be generated in a binding brake, and therefore which can be transmitted to an aircraft tire, is correspondingly increased.

Because of the known problems with auto-ignition, there is a mandated limit of 5% oxygen in aircraft tires; the presence of such low concentrations of oxygen prevents auto-ignition in the presence of isoprene.

Aircraft owners and users seek to meet this limit by filling the tires with nitrogen. Aircraft tires may require a pressure of around thirty atmospheres, for example, and so the air which is present in the tire before inflation becomes diluted by around thirty times. The air which was present in the tire before inflation will typically be atmospheric air containing around 21% oxygen; diluting this thirty times with pure nitrogen will result in an oxygen content within the tire of 0.7%, well within the mandated limit.

However, the nitrogen which is used to inflate (or reflate) the tire will seldom if ever be pure, and in certain cases might contain several percent oxygen. It is necessary that the nitrogen supply contain less than 4.3% oxygen (for a thirty atmosphere pressure tire) so that the 5% level can be met.

In many cases, the owners of aircraft will use liquid nitrogen to inflate and reflate the tires of their aircraft, and this supply can be close to 100% pure in practice. However, liquid nitrogen is expensive and other less diligent owners and users instead utilise pressurised nitrogen gas. Often the pressurised nitrogen gas is purchased primarily by price, and the quality (i.e. the percentage of oxygen present in the gas) is not certified and may not be known.

Also, at some airports the ground staff are not qualified or are not trained to appreciate the significance of the oxygen content of the tires, and it has been known that tires be filled from an oxygen supply when the nitrogen supply was not available!

In addition to the oxygen content of the gas within the aircraft tire being critical, the pressure of the gas within the tire is also important. Thus, a tire which is under-inflated does not offer the same level of grip as it is intended to provide, and under-inflated tires are believed to be particularly susceptible to aquaplaning or hydroplaning when there is standing water on the runway (where a layer of water becomes trapped between the tire and the surface of the runway, reducing the level of grip therebetween). There have been a number of aircraft accidents in which the aircraft has skidded off the runway, and aquaplaning is believed to be a likely cause of the aircraft's failure to stop.

2. DESCRIPTION OF THE PRIOR ART

Pressure testing devices for the tires of aircraft are well known. One form comprises a mechanical gauge similar to that first invented over one hundred years ago. More modern devices use an electromechanical sensor.

However, with such devices it is only feasible to test the pressure of the tires when they are at a known reference temperature, and this typically means that the tire must be at or close to the ambient temperature, otherwise the hot gas within the tire will be at a greater pressure than the corresponding gas when cold, and the temperature-induced variation will render the pressure reading unreliable.

In the United States, for example, the Federal Aviation Authority (F.A.A.) has expressed the wish that tire pressures be tested every day, but the airlines have indicated that this cannot be achieved in practice because aircraft are often in continual operation for up to three weeks at a time, and the aircraft is not on the ground within this period for long enough for the tires to cool sufficiently for reliable testing to take place.

Oxygen testing devices are also available, by which the oxygen content of an aircraft tire can be tested. However, the use of these devices is not universal because of the time taken to undertake the testing. Thus, it has been estimated that to test the pressure and oxygen content of every tire on a large aircraft can take up to two hours, and this is longer than the desired turn-around time for most aircraft (regardless of the time necessary for the tires to cool sufficiently for a reliable pressure test to be carried out).

SUMMARY OF THE INVENTION

It is an aim of the present invention to provide a tire testing device which can be used when the aircraft tire is hot or cold.

It is another aim of the present invention to provide a tire testing device which can test the pressure and oxygen content of the tire in a single operation, i.e. only a single application of the valve head upon the tire valve needs to be undertaken.

According to the invention therefore, there is provided a tire testing device including a pressure sensor, characterised in that the device also includes a temperature sensor.

Preferably, the device has means to store a record of the volume of the tire, and means to calculate an effective pressure at a reference temperature. In the preferred embodiments the effective pressure at a reference temperature can be calculated by the device, but in other (less preferred) embodiments the pressure calculation can be carried out separately, e.g. by a computer or other device to which the measured pressure and temperature are downloaded.

It is known that the relationship between the pressure, temperature and volume of a given quantity of gas are related to each other (by Boyle's Law), and knowledge of the volume of gas within the tire can enable a pressure reading at any particular temperature to be converted to a pressure reading at another (reference) temperature. Accordingly, if it is determined that the pressure of the tires should be measured at 0° C., and the actual pressure is measured at 50° C., then the equivalent or effective pressure at 0° C. can readily be calculated.

The ability of the device to measure the tires at any given temperature, and in the preferred embodiments to calculate the pressure at a reference temperature, enables the device better to check any leakage of gas which is occuring from a tire. Thus, with conventional pressure test apparatus it would still not be possible to obtain any really useful data even if an aircraft's tires were allowed to cool and be measured every day, if the same aircraft is present in a hot atmosphere such as Arizona on one day, and a cold climate such as Alaska on the following day, since the ambient temperature, and thus the temperature of the "cold" tire, might differ by 40° C. between the two locations.

Preferably, the device comprises a base unit and a valve head, the valve head being connected to the base unit by a flexible tube, the valve head being adapted to connect to the tire valve and to allow the escape of a small amount of gas therefrom. Preferably also the temperature sensor is located within the valve head, so that the temperature of the gas is measured as close to the tire as possible, and the likelihood of miscalculations occuring, because for example the gas has cooled on leaving the tire, are much reduced.

Desirably, the temperature sensor is a thermocouple. Desirably also, the pressure sensor is an absolute pressure sensor, i.e. a pressure sensor which can compare a pressure to be measured against vacuum. Usefully, the pressure sensor is a pressure transducer configured as a strain gauge, such as that produced by Kistler of Switzerland under model number MER 180.A.20. The "20" element indicates that the sensor can operate over a range of 20 bar which is believed to be sufficient for the majority of applications, but other sensors can be used, providing a greater (or lesser) range, if desired.

Desirably, the device also includes an oxygen sensor. Accordingly, the device can measure the pressure of the gas in the tire and can also measure the oxygen content at substantially the same time—in particular requiring the operator to extract only a single "shot" of gas from the tire for both the pressure and oxygen tests. In this way, if the pressure of all of the tires is measured every day, a record of the oxygen content can also be taken every day, and the reflation of the tire with poor quality nitrogen (i.e. containing a large percentage of oxygen), or even with oxygen instead of nitrogen, can quickly be ascertained.

Preferably, the oxygen sensor is located in the base unit. Thus, it is not necessary that the oxygen content be measured close to the valve since this content will not vary between the valve and the base unit. Preferably also, the base unit contains a chamber into which the tire gas can be passed, the oxygen sensor being located within the chamber. Desirably, the device includes means to purge the chamber, so that the gas from a previous tire measurement does not contaminate the test for the oxygen content of the next tire.

Usefully, the base unit is portable, and is ideally designed to be hand-held so that it may be carried around the aircraft, and specifically carried to each tire of the aircraft which is being tested. Preferably, the base unit includes a clip so that it may be suspended from a belt worn by the operator.

Accordingly, the device will be portable and the base unit will preferably contain at least one battery to provide electrical power. The battery is preferably rechargeable, but the device also ideally contains a non-rechargeable battery bay, so that non-rechargeable batteries can be purchased and used in the event that the rechargeable battery has not been sufficiently recharged prior to use.

Desirably, the base unit includes interface means by which the data stored therein can be downloaded to a computer such as a mainframe computer. The device can have a volatile memory in which can be stored the data corresponding to the oxygen content, the pressure measurement and the calculated effective pressure, of the tires of each aircraft which the operator has tested, and a permanent record of those measurements can be kept within the computer or outputted therefrom in permanent form.

Usefully, the device takes periodic measurements of the ambient atmosheric pressure and temperature, and can utilise those measurements in converting the measured pressure of the tire gas to the effective (reference) pressure. Thus, it is necessary also to account for the atmospheric pressure when calculating the effective pressure, and the device can cater for changes in the atmospheric pressure when making the effective pressure calculations. Accordingly, the pressure can be calculated at a reference temperature and also at a reference atmospheric pressure, so that the pressure within the tires of the same aircraft can be reliably measured at both sea level (e.g. Miami) and altitude (e.g. Denver), without the relative change in atmospheric pressure between those locations affecting the reliability of the effective pressure reading.

Preferably, the device has a "stand-by" mode in which the display may be switched off during periods of inactivity. However, the ambient pressure and temperature readings can continue to be taken periodically during these stand-by periods. The device can return to full operational mode when the operator activates a switch, though preferably this is automatic, and for example occurs when a significant rise in pressure or temperature is detected, indicating that a measurement is to take place.

Since the device will need to include a record of the volume of the tire, it has a permanent memory containing a database of the volume of the tires of the particular user's aircraft. Thus, the volume of gas within all available aircraft tires can be calculated or referred to, and the permanent memory of the device can be used to store the volume of the tires of each of the user's aircraft. In addition, the device will preferably include a display means by which the operator will be directed sequentially to each tire of the aircraft, and the device will automatically calculate the effective pressure by referring to the volume of each particular tire stored within its permanent memory.

The device will preferably have a control button which permits the operator to select the aircraft which is to be tested; the selection may be made by aircraft type, but preferably is made by reference to the aircraft's unique alphanumeric code, so that a record of the pressure and oxygen content of each tire of each aircraft can be maintained.

Desirably, the device has a display screen. Desirably also the control means of the device can cause a representation of the aircraft to appear on the display screen, the control means also identifying each tire of the aircraft upon the display screen in the sequential order in which the tires should be tested.

BRIEF DESCRIPTION OF THE DRAWINGS

The invention will now be described, by way of example, with reference to the accompanying schematic drawings, in which:

FIG. 4 shows the base unit of a second embodiment of tire testing device according to the invention.

DESCRIPTION OF THE EXEMPLARY EMBODIMENTS

Figure 1:
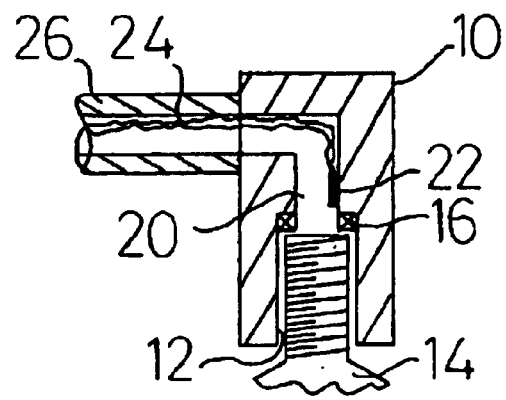
FIG. 1 shows the valve head of the device.

The valve head 10 shown in FIG. 1 is substantially of conventional design, and includes an opening 12 into which a part of the tire valve 14 of an aircraft tire (not shown) can be fitted. In known fashion, the opening carries a seal 16 against which the valve can be sealingly engaged, and means (not shown) to open the valve and allow air to escape from the tire and into the body 20 of the valve head.

Within the body 20 of the valve head, and immediately adjacent the opening 12, is located a temperature sensor 22. In this embodiment the temperature sensor 22 is a thermocouple, specifically a type T thermocouple having a positive element of copper and a negative element of constantin (a copper nickel alloy). The effective temperature range of such a thermocouple is approximately −185° C. to +300° C.

Figure 2:
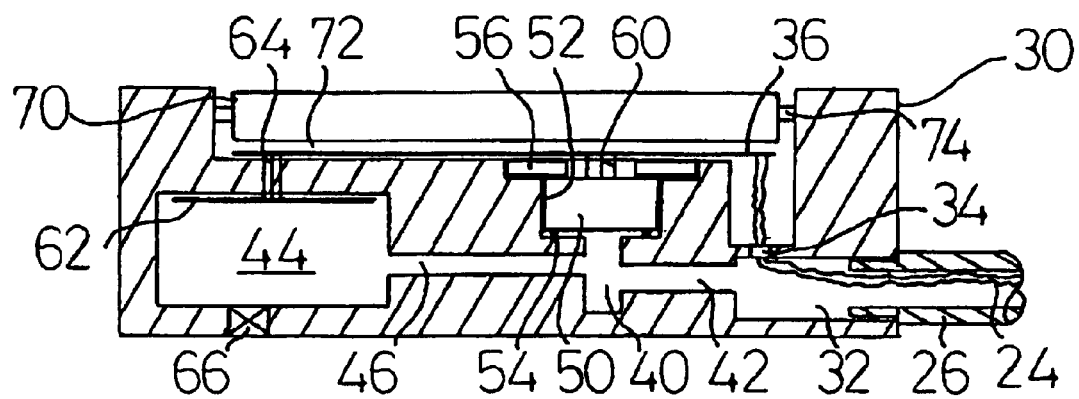
FIG. 2 shows the base unit of a first embodiment of tire testing device according to the invention.

The output of the thermocouple 22 is an electrical signal indicative of the temperature of the gas escaping from the tire. The electrical signal is carried by electrical leads 24, which pass along the hollow interior of the body 20 and also along the hollow interior of the flexible tube 26 which connects the valve head 10 with the base unit 30 (FIG. 2) or 130 (FIG. 4). As can be seen in FIG. 2, the hollow interior of the flexible tube 26 opens into a cavity 32 within the base unit, and the electrical leads 24 pass from that cavity, through a pressure seal 34, and terminate upon the printed circuit board 36.

The cavity 32 communicates with a further cavity 40 by way of conduit 42, and further cavity 40 communicates with a chamber 44 by way of conduit 46. In this way, gas which is extracted from the tire is fed along the flexible tube 26 and enters the cavities 32 and 40 and the chamber 44.

Adjacent to cavity 40 is located a pressure sensor 50, in this embodiment a solid state pressure sensor manufactured by Kistler of Switzerland, and specifically model number MER18A.20. The pressure sensor is located within a recess 52 in the body of the base unit 30, which recess carries an annular seal 54 to prevent the escape of any of the gas. The pressure sensor is retained within the recess 52, and a sealing pressure retained upon the annular seal 54, by a locking ring 56 which is suitably threaded and locates within a correspondingly threaded enlarged section of the recess 52.

It will be understood by those skilled in this art that this pressure sensor is an absolute pressure sensor, having a vacuum to one side of its working element. The pressure sensor functions by measuring the strain on the working element, which strain is indicative of the pressure differential between the two sides of the element. Other pressure sensors could be used, but it is expected that a strain gauge type of sensor such as that described would be most suitable.

The output of the pressure sensor 50 is an electrical signal indicative of the pressure within the cavity 40; electrical leads 60 communicate the output of the pressure sensor 50 to the printed circuit board 36.

The chamber 44 contains an electro-chemical oxygen sensor represented by panel 62. Commercially available oxygen sensors of the electrochemical type are known, and are available from City Technologies Limited of Portsmouth, U.K.—a suitable sensor is that sold by this company under reference number C/YO$_2$. In alternative embodiments, however, another type of oxygen sensor could be used, such as a solid state sensor similar to that disclosed in WO94/23289 but suitably configured to detect oxygen. A suitable solid state oxygen sensor is available from Omega High Technology Sensors Limited, Unit 8, Aston Fields Trading Estate, Sugarbrook Road, Bromsgrove, Worcestershire, B60 3DW, England. A solid state oxygen sensor is likely to be preferred by many operators.

The output of the oxygen sensor 62 is an electrical signal corresponding to the proportion of oxygen present in the gas within the chamber 44, and that electrical signal is communicated to the printed circuit board 36 by the electrical leads 64.

The device also includes a display screen 70. Suitably the display screen is a liquid crystal display. Since liquid crystal display screens are highly susceptible to irreversible temperature damage the screen is separated from the remainder of the base unit by an air gap 72, and engages the remainder of the base unit by way of thermally nonconductive (or poorly conductive) mounts 74. In this way, the screen 70 can be protected from the high temperatures which might occur within the remainder of the base unit because of the hot tire gases and/or because of incident solar radiation in a particularly hot climate. Preferably, the mounts 74 are resilient and flexible so that the screen 70 is also protected from physical shocks to the base unit 30.

Figure 3:
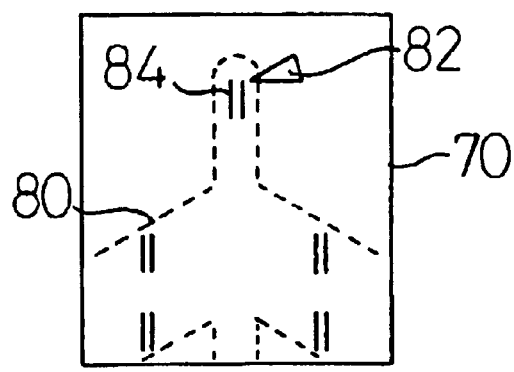
FIG. 3 shows one possible output of the display screen of the device.

One possible output of the display screen is shown in FIG. 3. Thus, when the device is first switched on the operator is asked to select the aircraft which is to be tested. Preferably, the permanent memory of the device includes only those aircraft within the fleet of the particular aircraft owner or user, so that the data for aircraft which are not in the fleet do not need to be retained in the memory. The base unit 30 (and also the base unit 130 of FIG. 4) will have a control button (not shown) which the operator can use to select the aircraft. Usefully, the control button is a rocker switch by which the operator can move a cursor up or down through a menu of the fleet's aircraft shown on the display means. Alternatively, a control button can be depressed repeatedly to scroll through a menu of the fleet. The display means will preferably show the aircraft type (e.g. "DC-10") and the aircraft's unique alphanumeric code.

Once the aircraft to be tested has been selected, the display will reveal a representation 80 of the aircraft. The representation shows each wheel or tire, and an arrow 82 is highlighted showing the operator which tire to check, in this case one of the nose-wheel tires 84. The microprocessor accesses the memory for the volume of that particular tire, so that the subsequent pressure measurement and temperature measurement (together with the ambient pressure and temperature measurements which have previously been (recently) recorded) can be used to convert the measured pressure into an effective pressure.

Alternatively, the arrow 82 can be omitted and instead the representation of the tire to be tested can flash intermittently upon the display panel 70, with tires which have already been tested being shown as solid and tires which have not been tested being shown in outline.

The measured pressure and the calculated effective pressure can be shown on the display panel 70, to confirm to the operator that the check has been completed successfully. In addition, the result of the oxygen content test can be displayed as a pass/fail, e.g. the letters "OK" can be displayed, or the letters "OK" ruled through with a cross for example (which it is believed will be understood by nationals of most countries of the World without requiring a translation)—if the oxygen test fails the operator can press a control button to display the actual oxygen content measured as a percentage.

Notwithstanding that the display means will preferably (initially) show only a pass/fail condition for the oxygen content, the microprocessor stores the actual percentage, and this actual percentage can be downloaded to the computer, so that changes in the actual percentage of oxygen within the tire can be checked.

Following the testing of the first tire, the arrow 82 (or other indicator) on the display 70 will move to another tire, and the operator can proceed to test that tire.

FIG. 4 shows a second embodiment of base unit 130. In this embodiment, the temperature reading, which is communicated from a thermocouple (not shown in FIG. 4) along electrical leads 24 (only one of which is shown in FIG. 4), is communicated to a first printed circuit board 86 which carries a first microprocessor 88. The pressure sensor which is located in cavity 40 (and which is not shown in FIG. 4, but may be identical to that of FIG. 2) also communicates with the first printed circuit board 86, and in turn with the first microprocessor 88, by way of electrical leads 60 (only one of which is shown in FIG. 4). The oxygen sensor which is located in chamber 44 (and which again is not shown in FIG. 4, but may be identical to that of FIG. 2) also communicates with the first printed circuit board 86, and in turn with the first microprocessor 88, by way of electrical leads 64 (only one of which is shown in FIG. 4).

The first printed circuit board 86 is shown schematically only, and in practice would carry components in addition to the microprocessor 88, which components could if desired condition or modify the signals received along electrical leads 24, 60 and 64 before transmission to the microprocessor 88.

The cavity 40, chamber 44, and first printed circuit board 86 are located in first housing part 90, which housing part also carries a first connector 92 which receives signals along lead 94 from the first microprocessor 88 (by way of other components to condition or modify the signal(s) if desired). Only one electrical lead 94 is shown between the printed circuit board 86 and the first connector 92, but in practice many electrical leads could be provided depending upon the number of separate signals required to be communicated.

The base unit 130 also includes a second housing part 96 which is designed to interconnect with, and be secured to, the first housing part 90 by way of suitable securing means (not shown). When secured together the first and second housing parts 90,96 comprise the base unit 130, which together with a flexible tube and valve head such as that shown in FIG. 2 comprise a complete tire testing device according to the invention. Also, when secured together the first connector 92 of the first housing part 90 is connected to a second connector 98 carried by the second housing part 96. The second connector 98 communicates with a second microprocessor 100 carried upon a second printed circuit board 102 within the second housing part 96. In this way, signals can be communicated between the first and second microprocessors 88,100 (and vice versa) by way of the first and second connectors 92,98.

The second microprocessor 100 drives the outputs from the tire testing device, i.e. the display screen 70 and also the data outputs, i.e. the data to be downloaded to a computer, for example. Once again, the second printed circuit board 102 would typically carry other components to modify or condition the input and/or output signals as desired.

The separable first and second connectors 92,98 between the first microprocessor 88 and the second microprocessor 100 are provided to permit the first housing part 90, including all of the sensors and the first microprocessor 88, to be removed from the device for calibration. Thus, notwithstanding that it might in some embodiments be possible to calibrate the device by way of a computer, or perhaps remotely by way of the internet, it is envisaged that some customers would prefer not to have to carry out the routine calibration work. Such customers could therefore periodically (perhaps once each year) send the first housing part 90 and its componentry to the supplier (or to an approved calibrator) for calibration, whilst a replacement (pre-calibrated) first housing part could be provided to the customer so that the device can continue to be used. Since recalibration can be made very straightforward for the customers, it is expected that routine recalibration would be a desirable, or perhaps mandatory, feature of operation of the device to ensure that the sensors and the first microprocessor retain their full operational effectiveness and accuracy.

The first and second microprocessors 88,100 can each have a security coding, so that a particular first housing part 90 (and its sensors and first microprocessor 88) can only be used with a particular second housing part 96 (and its display device 70 and second microprocessor 100). Such an arrangement would prevent the operator being able to swap around the respective housing parts from more than one device, which might allow the avoidance or delay of routine recalibration.

In addition, it is arranged that the first microprocessor 88, or another component carried by the first printed circuit board 86, includes an analogue to digital converter, so that the signals being communicated to the second microprocessor 100 are digital.

The second housing part 96 has four terminals 104 shown connected to the second printed circuit board 102. These terminals 102 are additional to the RS 232 data communication terminal (not shown) which is expected to be a desirable feature of the device. The terminals 104 are adapted for connection to corresponding terminals on the battery charger (not shown) to which the device will be periodically connected, usefully at the end of each work shift. The terminals 104 can be fitted with suitable contact surfaces, as will be well-understood by those skilled in the art.

Two of the terminals 104 are to provide electrical power to recharge the batteries (not shown), which are carried by the second housing part 96, whilst the other two terminals 104 can communicate by way of the battery charger with a computer. The latter two terminals 104 therefore correspond to the data input and data output terminals, by which the device can communicate with a host computer. It is expected that such an arrangement will be preferred over using the RS 232 terminal for such communication, since the RS 232 terminal is likely to become damaged by repeated (perhaps daily) connections. Thus, it is preferred to retain the RS 232 terminal for less frequent connection, as might be required for remote calibration, diagnostic checks or engineering inspection, for example. Thus, it is envisaged that remote diagnostic checks can be carried out upon the device, and certain (software related) failures of the device can be detected and rectified remotely, perhaps by way of the internet or other remote communications link. Also, if additional aircraft are added to the fleet then the data for the representation 80 of that aircraft, and the volume of each of the aircraft's tires, can be transmitted to the device (by way of the RS 232 connection or by way of the data terminals 104, as preferred) and added to its permanent memory, without the device having to be returned to the manufacturer or supplier.

It will be understood that the battery charging terminals can be connected to the batteries by way of suitable components on the printed circuit board 102, which components can condition or modify the incoming voltage and current if required. Preferably, however, the incoming voltage and current require no such conditioning or modification, and the battery charger supplies the desired recharging voltage and current.

As indicated, the device is likely to include a minimum number of control buttons, for example three control buttons. If it is desired that the device be PIN (personal identification number) controlled, so that it may be used only by known operators, then the battery charger can be fitted with a key-pad, suitably a numeric but perhaps an alphanumeric key-pad, and the PIN entry can be made by way of the battery charger and the data terminals 104. Using the battery charger in this way helps to ensure that the operator will enter the PIN in a controlled environment such as an office, and does not need to enter the PIN in an adverse environment such as outdoors in bad weather.

When the device is in use, it is necessary to ensure that the oxygen content of a previously-tested tire will not contaminate the gas of the subsequently-tested tire, and so the chamber 44 must be purged before each test. In the first embodiment of FIG. 2 an electrically-controlled fan 66 and a suitable valve (not shown) are provided for this purpose. When the valve is shut the chamber 44 is closed, and when gas is allowed out of the aircraft tire the pressure within the hollow interior of the flexible tube 26, the cavities 32 and 40, and the chamber 44 rapidly become equal to the pressure within the aircraft tire. However, when the test has been completed the valve can be opened and the fan 66 operated so as to expel the gas from within the chamber 44 (and also from within the cavities and conduits of the device) and replace this with atmospheric air.

Alternatively (and preferably) the chamber 44 can be purged with gas from the next tire to be tested. In such embodiments the component 166 (FIG. 4) is a valve, preferably a Schrader valve. The Schrader valve can be opened by an electric motor (not shown). It is necessary that the valve 166 remains open for a sufficient time to permit the gas within the chamber 44 to be flushed out by gas arriving along the flexible tube 26 (FIG. 2). The valve 166 is subsequently closed, allowing the chamber 44 to fill with gas from the tire being tested. It is necessary to purge all of the gas remaining from the previous test which is present within the chamber 44 (and the remainder of the device) before the oxygen content of the tire being tested can be accurately determined. The volume of the tube 26, cavities 32, 40, chamber 44, and conduits 42,46 of the device should be minimised as far as is practicable, and in a working design this volume is expected to be about 30 cc. To ensure complete purging with such a design it can be arranged that around 100 cc of gas is purged, i.e. 100 cc of gas is allowed to escape through the tire valve and pass into (and through) the device.

To avoid faulty or unreliable pressure readings, as might occur if the instrument is not applied correctly to the tire valve, the pressure sensor 50 takes sequential readings and only accepts a reading if three sequential readings are within a predetermined relative range. Experiments have shown that when using a strain gauge pressure sensor as preferred, the sensor will give a reading of approximately 98% of the actual pressure after approximately thirty seconds, and will give a 100% reading after approximately ninety seconds. It is believed that ninety seconds is too long to expect an operator to hold the valve head 10 upon the tire valve of the tire being tested, and so in practice it is expected that the actual pressure reading will be extrapolated from the 98% reading.

The microprocessor 88 has a permanent and a volatile memory (RAM). The permanent memory will contain the volume of each tire which will be tested by the device, and that information can be used by the microprocessor to convert the measured pressure at the measured temperature into an effective pressure measurement at a predetermined reference temperature. When the microprocessor 88 has calculated the effective pressure at the reference temperature and the reference ambient pressure, this is stored within the volatile memory of the device. The measured oxygen content of the tire is also stored in the volatile memory.

When the pressure and oxygen content of all of the tires of the aircraft have been measured, the results can be downloaded from the volatile memory of the device to a computer or other more permanent data recorder. Alternatively, the downloading of the data may occur once each shift, suitably at the end of the operator's work day, when the data from several aircraft can be downloaded together.

One suitable sequence of operations of the device utilising a base unit 130 of FIG. 4 is as follows. Firstly, the valve head 10 is applied to the valve of a tire. The pressure rise within the cavity 40 (which is due to the passage of gas along the flexible tube 26) is detected by the pressure sensor 50 which activates the first microprocessor 88. The valve head 10 is retained upon the valve for a period of 30 seconds, after which the microprocessor 88 interrogates the pressure readings from the pressure sensor. Sequential pressure readings are taken (approximately 1 microsecond apart), and if three sequential readings are sufficiently close together (preferably within 3.5% of each other) the average of those readings is determined to be 98% of the actual pressure. If, however, the sequential readings are not sufficiently close together (e.g. they differ by more than 3.5%) it is assumed that the operator has moved the valve head out of adequate contact with the valve, and more pressure readings are taken until three sequential readings are sufficiently similar. When three sufficiently similar sequential pressure readings have been obtained the first microprocessor 88 extrapolates the pressure reading to arrive at the actual (100%) pressure value.

After completion of the pressure sensing, the process continues with the oxygen test and temperature reading. Specifically, the first microprocessor 88 instructs the motor to open the valve 166 and purge the gas from within the chamber 44 and remainder of the device. To do this the motor drives a rod which in turn engages the pintle of the Schrader valve 166 (none of which is shown in the drawings, but which will be readily apparent to a skilled worker). The position of the rod is determined by a rotary encoder mounted on the motor, and in order to ensure that the rod opens the valve for the predetermined period of time the rod is first withdrawn to its fully retracted position (whereupon the current rises towards the stall level and is cut off before the motor stalls—this is to prevent the motor jamming), and then driven forward a predetermined distance necessary for the rod to engage the pintle. The rod is moved further so as to open the pintle and allow the escape of gas, and then closed after a predetermined time. The rod is moved away from the pintle initially so that its position can be accurately and reliably ascertained, i.e. it is not assumed that the position of the rod will be known sufficiently accurately unless it is first reversed to a known starting position.

As above indicated, whilst the "dwell volume" of the device is likely to be around 30 cc it is desired to purge around 100 cc of gas. The time for which the valve 166 must be open to purge 100 cc of gas at the pressures involved is likely to be very short, and the valve 166 may include a restriction to limit the rate of outflow of gas so that the desired purge quantity can be effectively controlled.

It is also desired that the temperature measurement be taken by the thermocouple 22 only after the device has been purged. The reason for this is that only a small volume of gas will flow through the valve head when it is first connected to the valve, i.e. whilst the valve 166 remains closed, and the thermal mass of the thermocouple itself will tend to corrupt any temperature measurements taken at that time. After the period of thirty seconds has passed, after which the pressure readings are taken, the temperature of the valve head will approach that of the gas expelled from the tire. Also, the additional 100 cc (or thereabouts) of gas which flows through the valve head during the purging process will result in a far more reliable temperature measurement, i.e. the temperature measured by the thermocouple 22 will be much closer to the actual temperature of the gas. Even so, however, it is expected that the measured temperature will be slightly below the actual temperature, and the deviation can be tested empirically, and the first microprocessor 88 include an algorithm to correct for this.

Preferably, the device also contains an electronic clock which can record the date and time of each test, i.e. to record the date and time on each occasion upon which the pressure sensor indicates that a tire pressure test has been made. This data can be downloaded together with the tire pressure and oxygen content. With such date and time recordal, the authorities can check that the testing is being carried out with sufficient frequency for every aircraft in a user or owner's fleet. Also, the aircraft user or owner can readily check any gradual decrease in tire pressure which may be occuring on a particular tire, and can perhaps use this information to determine which tire manufacturer produces the tires which require the most and/or the least reflation.

It is an additional advantage of the ability of the device to record the time and date of each measurement that the date of the last measurement can be ascertained. Thus, if the device ceases to work the date and time of the last measurement (before it ceased to work) can be determined, and the operator who was perhaps responsible for the device's failure can be identified. Operator's are likely to take more care of a device if it can be determined that their mis-use caused a failure of the device. Thus, notwithstanding that the device will preferably be manufactured to withstand a two-metre drop test, it will nevertheless still be possible to cause the device to fail through mis-use.

It will be understood that the relationship between the pressure within the tire, the temperature of the gas therein, and the volume of the gas, might not always be uniform, since the elasticity of the tire (and hence its volume) might change with temperature. However, such changes in elasticity are expected to have a minor effect so that the relationship is substantially uniform. If, however, experiment shows that the relationship is not sufficiently uniform for some aircraft tires, the lack of uniformity can be determined empirically, and the first microprocessor 88 (or the single microprocessor of the embodiment of FIG. 2) can include an algorithm to correct for the lack of uniformity.

In the drawings, the printed circuit boards 86,102, the microprocessors 88,100 and the various electrical leads, are shown within the respective housing parts which are drawn as solid. However, it will be understood that in practice these components are located in chambers or cavities within the housing parts.

Though not shown in the drawings, the display screen 70 will preferably have illuminating means by which the screen can be illuminated when the ambient light is insufficient to permit the display to be clearly seen. Preferably the device can have a light sensor to detect the level of ambient light, so that the illuminating means operates automatically. In addition, the device can carry a further illuminating means adapted to shine light onto the tire valve so that the operator can more readily locate the valve and correctly place the valve head 10 thereon.

Since the device will ideally be used in many countries of the World, it is preferable that the display screen 70 and the control buttons (not shown) use symbols or graphic representations rather than words, so as to avoid the requirement for translations. In addition, the device, and in particular the valve head and the control buttons, will typically be large enough to be operated by a gloved hand, since gloves will often be required in very cold and very hot climates. Thus, it is intended that the base unit be of a size and weight that it can readily be held in one hand, so that the operator can hold the base unit with one hand and the valve head with the other hand. It is also intended that the control buttons be accessible to the operator whilst the base unit is being held, also with one hand, so that the operator can access the controls buttons without needing firstly to remove the valve head from the tire valve.

The rechargeable battery (not shown) is designed to provide sufficient electrical power for the device to be operated for around fourteen hours, which is longer than a work day for most operators. In this way, the device can be used for a whole work day before needing to be recharged (in time for the next work day). Ideally, the volatile memory of the device is large enough to store data from many aircraft, and in particular more aircraft than can typically be tested in a fourteen hour period. Thus, the pressure and oxygen data need only be downloaded at the end of the operator's work day.

The base unit 30,130 should be designed to be resistant to damage caused by sunlight, ozone, and skydrol, the latter being a lubricant used for aircraft.

Notwithstanding that in both of the embodiments show (FIG. 2 and FIG. 4) an oxygen sensor is included, it is possible to provide a tire testing device able to test the pressure of the gas within the tires but not the oxygen content. Such embodiments would require only the pressure sensor and the temperature sensor.

What is claimed is:

1. A tire testing device comprising an opening, into which a part of a valve of the tire to be tested can be fitted, said opening leading into one or more cavities in said tire testing device, wherein a temperature sensor, a pressure sensor, and an oxygen sensor are located in said one or more cavities.

2. A tire testing device according to claim 1, further comprising means to store a record of the volume of the tire to be tested, and means to calculate an effective pressure at a reference temperature.

3. A tire testing device according to claim 1, which comprises a base unit and a valve head, wherein the valve head provides said opening, the valve head being connected to the base unit by a flexible tube, the valve head being adapted to allow the escape of gas from the valve of the tire to be tested.

4. A tire testing device according to claim 3, said one or more cavities comprising a first cavity located within the valve head, wherein the temperature sensor is located within the first cavity within said valve head.

5. A tire testing device according to claim 3, said one or more cavities comprising a second cavity and a chamber, wherein the pressure sensor is located within the second cavity, and wherein the oxygen sensor is located within the chamber.

6. A tire testing device according to claim 5, wherein the base unit comprises a first part and a second part, the first and second parts being separable from each other, wherein the flexible tube is connected to the first part, wherein said first part comprises said second cavity, the chamber, and a first microprocessor, wherein said second part comprises a second microprocessor, an interface means and a display means, and wherein the first and second parts have respective connecting means for intercommunicating with each other.

7. A tire testing device according to claim 5, further comprising means to control the escape of gas from the chamber.

8. A tire testing device according to claim 1, further comprising at least one battery to provide electrical power.

9. A tire testing device according to claim 1, further comprising an interface means by which data stored within said tire testing device can be downloaded to a computer.

10. A tire testing device according to claim 1, further comprising a control means and a display means, the control means being adapted to display a representation of an aircraft on the display means, the control means also being adapted to identity each tire of the aircraft on the display means in a sequential order.

* * * * *